June 10, 1969     G. I. BANNISTER     3,449,027
ROD END BEARING MEMBER
Original Filed July 8, 1965
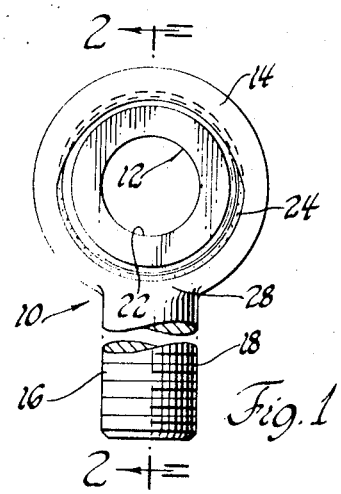
Fig. 1
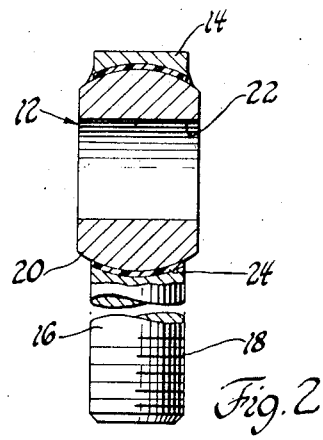
Fig. 2
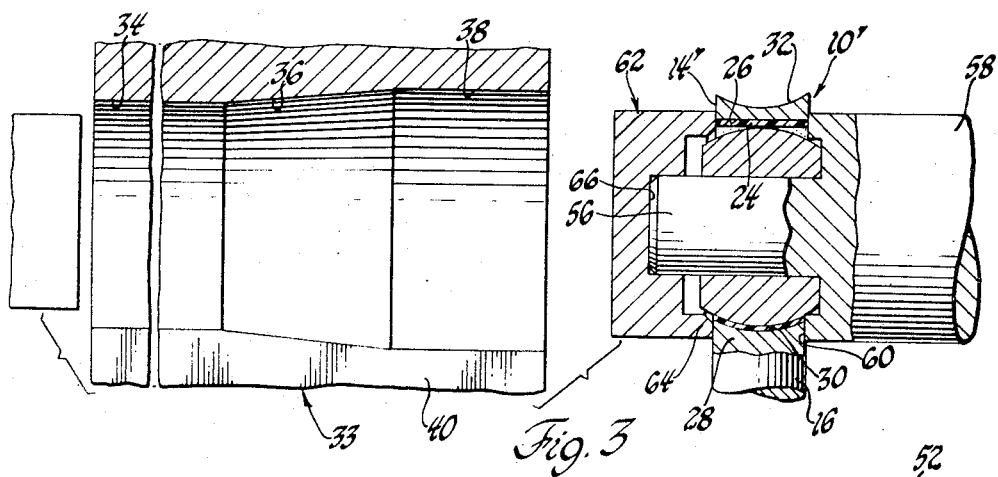
Fig. 3
Fig. 4
Fig. 5
INVENTOR.
George I. Bannister
BY
Bernard, McElynn & Leising
ATTORNEYS United States Patent Office 3,449,027
Patented June 10, 1969

3,449,027
ROD END BEARING MEMBER
George I. Bannister, Orange, Calif., assignor, by mesne assignments, to Lear Siegler, Inc., Santa Monica, Calif., a corporation of Delaware
Application Feb. 20, 1967, Ser. No. 617,419, which is a continuation of application Ser. No. 470,375, July 8, 1965. Divided and this application Nov. 1, 1967, Ser. No. 679,804
Int. Cl. F16c 11/06
U.S. Cl. 308—72                    7 Claims

ABSTRACT OF THE DISCLOSURE

In a preferred form the present invention relates to a rod and member and bearing assembly which includes a banjo-type member having a cylindrical outside diameter with an inside diameter separated from a ball member by some low friction material, said inside diameter substantially conforming to the outside diameter of the ball-type member.

---

This application is a divisional application of the parent application Ser. No. 617,419 filed Feb. 20, 1967, which, in turn, was a continuation of a parent application Ser. No. 470,375 filed July 8, 1965, now abandoned.

This invention relates to ball and socket joints of the type wherein a spherical ball is surrounded by an outer member and wherein the outer member has an inner surface conformed to the surface of the spqherical ball, and more particularly to an article forming a part of such joints and to a method of manufacturing such joints.

In the design and manufacture of many machine elements, it is often desirable to provide a ball and socket joint so that one member may be permitted universal movement relative to another. A typical example of such constructions is in the rod end joints commonly used in automotive suspensions.

In the formation of such rod end joints, it is common to provide a truncated spherical ball having a cylindrical axial opening therein forming one part of the joint assembly. A rod end member, including a banjo portion and a rod portion, forms the second part of the joint. The banjo portion receives the spherical ball and has an inner surface conformed to the spherical surface of the ball. Thus, the ball is permitted substantially universal motion within the banjo portion of the rod end member. A suitably formed machine element receives the ball, by means of the axial cylindrical bore, and the rod end member is provided with a thread on the end of the rod portion, for securement in or to another element of the machinery as desired.

In the past, the usual method of forming such rod end ball and socket joints has been to provide a two-part swaging die assembly, so constructed that the ball may be mounted within one of the die parts and spaced from the spherical walls, and so dimensioned as to receive the banjo portion of the rod end member. The rod end member is disposed within one of the parts of a swaging die and over the spherical ball, and the second part of the swaging die is forced under pressure toward the first. This causes the banjo portion of the rod end member to assume the spherical shape of the die cavities. In so doing, the inner surface of the banjo portion is forced inwardly to conform to the shape of the spherical ball, and the rod member is thus secured around the ball. Such a process is relatively expensive, due to the cost of the swaging dies and the various machining operations necessary to complete the assembly. The swaging dies must be formed to extremely close tolerances in order to provide the proper flow of metal in the banjo portion of the rod end member to conform the banjo portion to the contour of the spherical ball. Furthermore, such an assembly and forming process is time consuming in requiring very precise location of the spherical ball within the swaging dies and precise location of the rod end member in the proper position within the swaging dies prior to the swaging operation.

It is here proposed to provide a rod end member having a banjo portion wherein a part of the inner surface is cylindrical and the part of the inner surface adjacent the rod portion is formed to the spherical radius of the ball. The outer surface of the banjo portion, with the exception of the rod portions, is circumferentially grooved, or arcuately concave. Also provided is an elongated swaging die that is first conical and then cylindrical, the cylindrical portion having a diameter which is substantially the same as the desired final outer diameter of the banjo portion. The cylindrical part of the inner surface of the banjo portion is formed to a diameter that is substantially the same as the spherical diameter of the inner ball. The minimum diameter of the outer circumferentially grooved portion of the banjo is substantially the same as the final diameter desired of the banjo portion after it is conformed to the surface of the ball. In the forming process, the spherical ball is mounted within the banjo portion of the rod end member, seating in that part of the banjo portion having the spherical radius. This assembly is then forced through the conical-cylindrical swaging die so that the metal of the banjo portion on either side of the groove is forced generally radially inwardly, and the metal on the cylindrical inner surface of the banjo portion flows into conformity with the spherical surface of the ball. Sufficient metal is provided on either side of the circumferential groove in the banjo portion to provide complete conformity to the spherical ball surface.

The use of a rod end member and the conical-cylindrical swaging die above-described, results in an extremely inexpensive and efficient rod end bearing structure which may be rapidly assembled and formed to the desired shape and in the desired manner. The swaging die is extremely simple to manufacture and produce, and the manner in which the assembly is forced through the swaging die is extremely simple and uncomplicated.

These and other advantages will become more apparent as the description proceeds, having reference to the following drawings in which:

FIGURE 1 is an elevational view of a typical rod and bearing structure utilizing a ball and socket joint manufactured in accordance with the invention;

FIGURE 2 is a cross-sectional view of the structure illustrated in FIGURE 1, taken substantially along the line 2—2 of FIGURE 1, and looking in the direction of the arrows;

FIGURE 3 is a view of the swaging die and the ball and rod end member utilized to form the rod end bearing illustrated in FIGURES 1 and 2, with parts broken away and in section to illustrate the position of the various parts;

FIGURE 4 is a sectional view of the swaging die illustrated in FIGURE 3 and rotated 90° in the plane of the section, the section being taken substantially along the line 4—4 of FIGURE 3, and looking in the direction of the arrows and showing the rod end bearing mounted therein; and FIGURE 5 is a perspective view of a shoe member receivable over the rod portions of the rod end member and slidably received in the swaging die to support the banjo portion of the rod end member.

Referring more particularly to the drawings, FIGURES 1 and 2 best illustrate a typical rod end bearing element forming a ball and socket joint. It is to be understood at the outset that although the description relates to a rod end bearing, the article and method of manufacture are equally applicable to any other machine element of the general type where a first part is conformed to the ball and a second part extends from the first part.

The rod end bearing, illustrated in FIGURES 1 and 2, includes a rod end member, illustrated generally by the numeral 10, and a truncated spherical ball, illustrated generally by the numeral 12. Rod end member 10 includes a banjo portion 14 from which extends a rod portion 16. The extreme end of the rod portion being threaded, as at 18, for convenience in mounting as desired. Banjo portion 14 has its inner surface conformed to the spherical surface 20 of the truncated spherical ball 12 to permit universal movement of the parts. The ball 12 is provided with a cylindrical axial bore 22 to permit mounting on a suitable machine element. Disposed between the inner surface of the banjo portion 14 and the spherical surface 20 of the ball 12 may be a layer of low friction material 24 to provide lubricity for the joint.

Referring now to FIGURE 3, the structure and configuration of the rod end member 10 prior to deformation to conform the inner surface of the banjo portion 14 to the spherical ball is best shown. Rod end member 10' is provided with an axial cylindrical bore 26 in the part of the banjo portion 14' extending from one side of the rod portion 16 and around to the other side of the rod portion 16. That part of the banjo portion 14' that is adjacent the rod portion 16, illustrated by the numeral 28, is formed with a spherical inner surface having the same spherical radius as the ball 12. The spherical inner surface 30 in the banjo portion 14' flares into and smoothly joins the inner cylindrical surface 26 in the remaining part of the banjo portion 14'.

The outer surface 32 of the banjo portion 14' is formed to provide a greater amount of material at the edges of the rod end member than at the center thereof. A circumferentially arcuately concave shape has been found to be satisfactory, although other shapes or grooves may be used as well. It is necessary that the amount of metal adjacent the forward and rearward end planes of the banjo portion 14' be greater than the amount of metal at the center of the banjo portion 14'. The circumferentially arcuately concave groove extends around the outer surface of the banjo portion 14' from either side of the rod portion 16. Such curvature blends into the rod end member at the rod portion 16 to provide a smooth appearance.

The inner surface of the banjo portion 14' may be provided with a layer of low friction material 24 in order to provide the necessary lubricity for the joint upon its completion. Such low friction material may take any suitable form. However, it is preferred that such material include fibers of low friction organic polymeric material, such as Teflon, and more particularly it is preferred that the material be a Teflon cloth bonded by a phenolic resin to the inner surface of the banjo portion 14. Such Teflon cloth material is covered by United States Patents Nos. 2,885,248, and Re. 24,765 in the name of Charles S. White. At the same time, it is to be noted that such low friction material is not absolutely necessary to either the operation of or the method of forming the rod end bearing, should some other lubricating means be provided. It is apparent that the diameter of the inner surface of the banjo portion 14 must be adjusted according to the presence or absence of the low friction material 24.

The swagging die, illustrated generally by the numeral 33 in FIGURE 3, includes a cylindrical section 34 having a diameter that is substantially the same as the final desired diameter of the banjo portion 14 of the rod end member 10. Adjacent the cylindrical section 34 is a conical section 36, the narrower end of which has a diameter substantially the same as the cylindrical section 34, and which open into the cylindrical section 34. The maximum diameter of the conical portion 36 may be any suitable dimension, so long as it is equal to or greater than the maximum diameter of the banjo portion 14' at the forward and trailing ends thereof. For convenience, the die structure 33 is shown to include a second cylindrical portion 38 having a diameter that is substantially the same or slightly greater than the maximum diameter of the banjo portion 14'. Cylindrical portion 38 opens into the larger end of the conical portion 36. Formed in the die 33 is a longitudinal slot 40 which is wide enough and deep enough to receive the rod portion 16 of the rod end member 12 and permit passage through the die structure 33 during the forming process.

Also formed through the die structure 33 is an arcuately transverse slot 42 having tapered longitudinal walls 44 and an arcuate wall 45. Slot 42 intersects slot 40 and joins the cylindrical-conical-cylindrical sections 34, 36 and 38, respectively. As best illustrated in FIGURES 4 and 5, a hardened arcuate shoe, illustrated generally by the numeral 46, is received over the rod portion 16 and is slidable through the die structure 33 in the slot 42.

Shoe 46 has a central aperture 48 received on the rod portion 16 and an arcuate surface 50 conformed to the outer surface of the banjo portion 14 adjacent the point of connection between the banjo portion 14 and the rod portion 16. Inclined end walls 52 and an arcuate surface 54 mate with walls 44 and arcuate wall 45. Thus, as the road end member is forced through the die 33, as will become hereinafter more apparent, shoe 46 prevents the banjo portion 14 from extruding into the slot 40.

It will now be apparent that the truncated spherical ball 12 may be mounted on a locating pin or stud 56 extending from a suitable ram structure 58 and the rod end member 10' may be disposed over the ball 12 abutting the end face 60 of the ram 58. The spherical ball 12 may be easily mounted in the rod end member 10 prior to mounting on the ram stud 56, by simply seating the spherical ball in the spherical inner surface of the banjo portion 14'. The shoe 46 is mounted on the rod portion 16 and the assembly is then placed on the stud 56 of the ram 58. The ram is then forced completely through the three sections of the swaging die 33. The rod portion 16 of the rod end member 10 passes through the slot 40 provided in the wall of the die 33 and the shoe 46 passes through its slot 42. As the assembly passes through the conical portion 36 of the swaging die, the excess of metal in the banjo portion 14' at the forward and trailing ends will deform downwardly to fill the space between the cylindrical inner surface of the banjo portion 14' and the outer spherical surface of the ball 12. As the assembly completely passes through the end cylindrical section 34, the result will be as illustrated in FIGURE 5, wherein the outer surface of the banjo portion 14 is made smoothly cylindrical, and the inner cylindrical surface of the banjo portion 14 is made to conform to the spherical surface of the ball 12.

In order to provide coplanar end surfaces on the leading and trailing end planes of the banjo portion 14, a swaging member, illustrated generally by the numeral 62 in FIGURE 3 is provided. Member 62 includes an annular flange 64 extending toward and engaging the leading end surface of the banjo portion 14' radially outwardly from the ball member 12, and a central locating and clearance bore 66 receivable over the end of stud 56. Suitable stop means, not shown, are provided near the end of cylindrical portion 34 of the die structure 33 so that the member 62 will sandwich the banjo portion 14, after it is conformed by the portion 34 to its arcuate shape, between itself and the end face 60 of the ram 58. Sufficient force is provided to flatten the leading end surface to arrive at a shape such as shown in FIGURE 2. The stop means may then be removed and the entire assembly pushed through the die structure 33 for removal therefrom.

Thus, a relatively simple and inexpensive structure and method are provided for forming rod end bearings or the like, for further mounting in machine elements. The use of a conical-cylindrical swaging die assures perfect sizing of the parts on a production basis, and the entire operation may be carried out in an extremely efficient and economical manner.

Providing a swaging die with a slot therethrough to receive a depending portion of the member forced through the die permits complete formation of the remaining part of the member forced through the die to its proper conformation to the surface of the ball.

Changes and modifications in the structure and method hereinbefore described will become apparent to those having skill in the art after having had reference to the foregoing description and drawing. However, it is not intended to limit the scope of the invention by the foregoing description and drawing, but by the scope of the appended claims.

The embodiments of the invention in which exclusive property or privilege is claimed are defined as follows:

1. A rod end member for a rod end bearing of the type having a banjo portion receiving a spherical ball and comprising;
   an axially cylindrical inner surface in a portion of said banjo and having a diameter substantially the same as the diameter of the ball;
   a spherically formed inner surface in a portion of said banjo and having a diameter the same as said ball;
   and an outer surface on a portion of said banjo having a circumferential groove formed therearound;
   said rod end member being receivable over said ball and deformable to conform said axially cylindrical inner surface of said banjo portion to said spherical ball.

2. A rod end member for a rod end bearing of the type including a banjo portion adapted to receive and retain a spherical ball and a rod portion extending from said banjo portion and comprising:
   an axially cylindrical inner surface in part of said banjo portion;
   a spherical inner surface in the part of said banjo portion adjacent said rod portion;
   and a circumferentially concave outer surface around the part of said banjo portion having said cylindrical inner surface, said outer surface having greater diameters at the ends of said rod end member than at the central plane of said rod end member;
   said rod end member being adapted to receive said ball and being deformable to conform said cylindrical inner surface of said banjo portion to said spherical ball and to make said circumferentially concave outer surface cylindrical.

3. A rod end member for a rod end bearing of the type including a banjo portion adapted to receive and retain a spherical ball and a rod portion extending from said banjo portion and comprising:
   an axially cylindrical inner surface in part of said banjo portion;
   a spherical inner surface in the part of said banjo portion adjacent said rod portion;
   an outer surface having a circumferential groove formed around the part of said banjo portion having said cylindrical inner surface;
   and a layer of low friction material disposed around said cylindrical inner surface of said spherical inner surface in said banjo portion;
   said rod end member being adapted to receive said spherical ball and being deformable to conform said cylindrical surface of said banjo portion and said low friction material to said spherical ball.

4. The rod end member set forth in claim 3 wherein said low friction material is bonded to said inner surfaces.

5. The rod end member set forth in claim 3 wherein said low friction material includes fibers of low friction organic polymeric material.

6. The rod end member set forth in claim 3 wherein said low friction material includes fibers of polytetrafluoroethylene.

7. The rod end member set forth in claim 3 wherein said low friction material includes low friction fibers in the form of cloth bonded to said inner surfaces by thermosetting resin.

References Cited

UNITED STATES PATENTS

| 2,898,671 | 8/1959 | Heim | 29—149.5 |
| 2,928,698 | 3/1960 | Feighofen | 308—72 |
| 3,351,999 | 11/1967 | McCloskey | 29—149.8 |

FOREIGN PATENTS

| 35,682 | 9/1922 | Norway. |

EDGAR W. GEOGHEGAN, *Primary Examiner.*

L. L. JOHNSON, *Assistant Examiner.*